United States Patent
Nylander et al.

(10) Patent No.: US 9,510,374 B2
(45) Date of Patent: Nov. 29, 2016

(54) ENTITY OF A MOBILE CELLULAR NETWORK

(71) Applicant: TELEFONAKTIEBOLAGET L M ERICSSON (PUBL), Stockholm (SE)

(72) Inventors: Tomas Nylander, Värmdö (SE); Per-Daniel Stälnacke, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 14/440,282

(22) PCT Filed: Nov. 2, 2012

(86) PCT No.: PCT/EP2012/071759
§ 371 (c)(1),
(2) Date: May 1, 2015

(87) PCT Pub. No.: WO2014/067585
PCT Pub. Date: May 8, 2014

(65) Prior Publication Data
US 2015/0305072 A1    Oct. 22, 2015

(51) Int. Cl.
*H04W 76/02*    (2009.01)
*H04W 8/04*    (2009.01)
(Continued)

(52) U.S. Cl.
CPC ............ *H04W 76/021* (2013.01); *H04W 8/04* (2013.01); *H04W 84/12* (2013.01); *H04W 36/14* (2013.01); *H04W 88/06* (2013.01)

(58) Field of Classification Search
CPC ... H04W 8/04; H04W 8/22; H04W 36/0027; H04W 36/14; H04W 36/22; H04W 76/021; H04W 76/025; H04W 84/12; H04W 88/06; H04W 88/10; H04W 92/00–92/16
USPC .................................................. 370/310–350
See application file for complete search history.

(56) References Cited

U.S. PATENT DOCUMENTS 7,778,637 B2 *   8/2010   Zhang ................... H04L 63/10
                                                    455/426.1
8,948,137 B2 *   2/2015   Sachs ........................... 370/332
(Continued)

FOREIGN PATENT DOCUMENTS

EP    2222117 A2    8/2010
EP    2490469 A1    8/2012
WO    2007076147 A2    7/2007

OTHER PUBLICATIONS

International Search Report and Written Opinion issued in corresponding international application No. PCT/EP2012/071759 dated Oct. 7, 2013, 10 pages.

*Primary Examiner* — Tri H Phan
(74) *Attorney, Agent, or Firm* — Patent Portfolio Builders, PLLC

(57) ABSTRACT

Entity of a 3rd Generation Partnership Project, 3GPP, network including a 3GPP Radio Access Network, RAN. The entity includes a receiver and a processor. The receiver is operable to receive the WLAN identifier associated with the device. The processor is operable to cause storage of the WLAN identifier in association with a 3GPP identifier identifying the device in the 3GPP network. The entity may also be provided with a transmitter operable to transmit a request to device in communication with the 3GPP RAN, the request including a request for a WLAN identifier associated with the device. There is also provided a device in communication with a 3rd Generation Partnership Project, 3GPP, network. The device includes a processor and a transmitter. The processor is operable to retrieve a WLAN identifier associated with the device in response to the request. The transmitter is operable to transmit the retrieved WLAN identifier to the 3GPP network. Methods of operating the 3GPP entity and the device are also described. The device may also include a receiver operable to receive a request from an entity of the 3GPP network at the device, the request including a request for a WLAN identifier associated with the device.

22 Claims, 5 Drawing Sheets

(51) Int. Cl.
*H04W 84/12* (2009.01)
*H04W 36/14* (2009.01)
*H04W 88/06* (2009.01)

(56) References Cited

U.S. PATENT DOCUMENTS

| | | | |
|---|---|---|---|
| 9,380,494 B2* | 6/2016 | Sirotkin | H04W 28/08 |
| 2006/0140149 A1 | 6/2006 | Kim et al. | |
| 2007/0190974 A1* | 8/2007 | Zhang | H04L 63/08 |
| | | | 455/411 |
| 2008/0165702 A1 | 7/2008 | Bienas et al. | |
| 2009/0131053 A1* | 5/2009 | Sachs | H04W 36/0016 |
| | | | 455/436 |
| 2010/0291947 A1* | 11/2010 | Annamalai | H04W 36/385 |
| | | | 455/456.1 |
| 2011/0063997 A1* | 3/2011 | Gras | H04W 92/02 |
| | | | 370/254 |
| 2011/0292914 A1* | 12/2011 | Sachs | H04W 36/0016 |
| | | | 370/332 |
| 2013/0095789 A1* | 4/2013 | Keevill | H04W 12/06 |
| | | | 455/411 |
| 2014/0101726 A1* | 4/2014 | Gupta | H04N 21/2365 |
| | | | 726/4 |

\* cited by examiner

ENTITY OF A MOBILE CELLULAR NETWORK

CROSS REFERENCE TO RELATED APPLICATION(S)

This application is a 35 U.S.C. §371 National Phase Entry Application from PCT/EP2012/071759, filed Nov. 2, 2012, the disclosure of which is incorporated by reference.

TECHNICAL FIELD

The present invention relates to an entity, and a method of operating an entity of a mobile cellular network, and in particular a 3rd Generation Partnership Project (3GPP) network. More particularly, the invention relates to an entity of a 3GPP RAN and a method of operating an entity of a 3GPP RAN for determining a MAC address associated with a device that is attempting to associate with the 3GPP RAN.

BACKGROUND

Data traffic in mobile telecommunications networks is continually increasing. Consequently, operators are employing heterogeneous access networks that utilise multiple radio access technologies (RATs) in order to provide greater capacity, particularly in high traffic areas and areas that otherwise have poor network coverage.

Typically, the radio access technologies utilised as part of these heterogeneous access networks include UMTS Radio Access Network (UTRAN) and an Evolved UTRAN (eUTRAN), and Wi-Fi/WLAN. For example, FIG. 1 illustrates schematically a simplified example of a heterogeneous network 1 that comprises a 3GPP RAN 2 and a Wi-Fi RAN 3 suitable for implementing the methods described herein. The 3GPP RAN 2 includes a number of 3GPP radio nodes 4. For example, if the 3GPP RAN was a UTRAN, then these radio nodes would be Node Bs and Radio Network Controllers (RNC). By way of further example, if the 3GPP RAN was an EUTRAN, then these radio nodes would be eNode Bs. The 3GPP RAN 2 is connected to a mobile core network 5. The Wi-Fi RAN 3 includes a number of Wi-Fi/WLAN APs 7 that are connected to a Wi-Fi/WLAN Access Controller (AC) 8. The Wi-Fi/WLAN AC 8 can control each of the Wi-Fi/WLAN APs 7 and implements authentication of a mobile station/user terminal that wants to associate with/attach to the Wi-Fi RAN/WLAN 3.

If the heterogeneous access network comprises a UTRAN, an eUTRAN, and a Wi-Fi RAN/WLAN then both the UTRAN and eUTRAN standards are defined by the 3rd Generation Partnership Project (3GPP), and the relevant 3GPP standards therefore define capabilities for handling load sharing between these 3GPP RANs. In contrast, the Wi-Fi/WLAN standards are defined by the Institute of Electrical and Electronics Engineers (IEEE), and neither the IEEE standards nor the 3GPP standards define capabilities for handling load sharing between Wi-Fi/WLAN and the 3GPP RANs.

In particular, for most currently available devices, i.e. user equipments (UE) or a client device, when the device is within the coverage of both a Wi-Fi RAN/WLAN and a 3GPP RAN, the device will automatically attempt to connect to the Wi-Fi RAN/WLAN and will detach from the 3GPP RAN. Therefore, the decision to move from the 3GPP RAN to the WLAN is made without having considered the load and/or performance of either RAN, and can result in a reduction in performance that is detrimental to both the networks and the user.

In order to provide at least some form of load steering between a Wi-Fi RAN/WLAN and a 3GPP RAN, it is currently being proposed that when a device attempts to associate with the Wi-Fi RAN/WLAN, any relevant conditions of both the WLAN and the 3GPP RAN are evaluated and it is thereby determined whether the device should use the Wi-Fi RAN/WLAN or an available 3GPP RAN. However, as the user equipment identifiers used in the Wi-Fi RAN/WLAN and the 3GPP RAN are different evaluating the relevant conditions of the Wi-Fi RAN/WLAN and the 3GPP RAN is not a simple operation.

SUMMARY

In accordance with an aspect of the present invention there is provided a method of operating an entity of a 3rd Generation Partnership Project, 3GPP, network including a 3GPP Radio Access Network, RAN. The method includes receiving a WLAN identifier associated with a device, causing storage within the 3GPP network of the WLAN identifier in association with a 3GPP identifier identifying the device in the 3GPP network.

By storing the WLAN identifier in association with a 3GPP identifier, measurements from WiFi and 3GPP systems relating to the device may readily be compared using the association between the WLAN identifier and the 3GPP identifier for the device. For example, it makes it possible for a 3GPP entity to provide relevant conditions of the 3GPP RAN in response to a request for 3GPP information including a WLAN identifier for a device. Additionally, the association of the WLAN identity and the 3GPP identity of the device may be used to create a common context for a device for use in other operations such as traffic steering applications.

The method may include transmitting a request to a device in communication with the 3GPP network, the request including a request for a WLAN identifier associated with the device. This enables an entity of the 3GPP network to prompt the device for the WLAN identifier associated with the device, this may be of use for example, if the 3GPP network receives a request from a device in a WLAN network for information relevant to the device.

The request for the device's WLAN identifier may be transmitted using a Non-Access Stratum, NAS, protocol or alternatively using a Radio Resource Control, RRC, protocol.

The obtained WLAN identifier may be stored in association with the 3GPP identifier in a memory of the 3GPP entity or alternatively/additionally, the 3GPP entity may send a storage request to a further entity of a 3GPP network, the storage request including the obtained WLAN identifier and the 3GPP identifier.

The WLAN identifier may be, for example, the MAC address associated with the device.

The 3GPP entity or the further 3GPP entity may be a core network node or a radio network node. For example the 3GPP entity or further 3GPP entity may be part of a management system for the 3GPP RAN or the core network of the 3GPP network.

According to another aspect of the present invention there is provided an entity of a 3rd Generation Partnership Project, 3GPP, network including a 3GPP Radio Access Network, RAN. The entity includes a receiver and a processor. The receiver is operable to receive the WLAN identifier associated with the device. The processor is operable to cause storage of the WLAN identifier in association with a 3GPP identifier identifying the device in the 3GPP network.

By storing the WLAN identifier in association with a 3GPP identifier measurements from WiFi and 3GPP systems relating to the device may readily be compared using the association between the WLAN identifier and the 3GPP identifier for the device. For example, it makes it possible for a 3GPP entity to provide relevant conditions of the 3GPP RAN in response to a request for 3GPP information including a WLAN identifier for a device. Additionally, the association of the WLAN identity and the 3GPP identity of the may be used to create a common context for a device for use in other operations such as traffic steering applications.

The entity may also include a transmitter operable to transmit a request to device in communication with the 3GPP RAN, the request including a request for a WLAN identifier associated with the device. This enables an entity of the 3GPP network to prompt the device for the WLAN identifier associated with the device, this may be of use for example, if the 3GPP network receives a request from a device in a WLAN network for information relevant to the device.

The request may be transmitted using a Non-Access Stratum, NAS, protocol or a Radio Resource Control, RRC, protocol.

The processor may cause storage of the WLAN identifier in a memory of the 3GPP entity or, alternatively/additionally, the processor may cause the transmitter to transmit a storage request to a further entity of a 3GPP network, the storage request including the obtained WLAN identifier and the 3GPP identifier. The further entity then stores the obtained WLAN identifier and the 3GPP identifier.

The WLAN identifier may be, for example, a MAC address associated with the device.

The 3GPP entity or the further 3GPP entity may be a core network node or a radio network node. For example the 3GPP entity or further 3GPP entity may be part of a management system for the 3GPP RAN or the core network of the 3GPP network.

According to a further aspect of the present invention there is provided a method of operating a device in communication with a 3rd Generation Partnership Project, 3GPP, network. The method includes retrieving the WLAN identifier associated with the device and transmitting the retrieved WLAN identifier to the 3GPP network.

The retrieved WLAN identifier may be transmitted using a Non-Access Stratum, NAS, protocol or a Radio Resource Control, RRC, protocol.

Optionally, the method may also include receiving a request from an entity of the 3GPP network at the device, the request including a request for a WLAN identifier associated with the device. The device transmits the WLAN identifier in response to the request.

Alternatively, retrieving the WLAN identifier and transmitting the WLAN identifier is performed when the device is associating with the 3GPP network. This enables the 3GPP network to be provided with the WLAN identifier when the device associates with the network and therefore limits the processing demands on the 3GPP network as it does not require the 3GPP network to request the WLAN identifier associated with the device.

According to yet another aspect of the present invention there is provided a device in communication with a 3rd Generation Partnership Project, 3GPP, network. The device includes a processor and a transmitter. The processor is operable to retrieve the WLAN identifier associated with the device. The transmitter is operable to transmit the retrieved WLAN identifier to the 3GPP network.

Optionally, the device may be provided with a receiver to receive a request from an entity of the 3GPP network at the device, the request including a request for a WLAN identifier associated with the device. The processor is then configured to retrieve the WLAN identifier in response to the request.

Alternatively, the processor may retrieve the WLAN identifier during association with the 3GPP network.

The transmitter may transmit the retrieved WLAN identifier using a Non-Access Stratum, NAS, protocol or a Radio Resource Control, RRC, protocol.

BRIEF DESCRIPTION OF THE DRAWINGS

Some embodiments of the present invention will now be described in detail with reference to the accompanying drawings, in which.

DETAILED DESCRIPTION

In order to at least mitigate the problems identified above there will now be described a method of operating an entity of a 3GPP RAN that enables the 3GPP RAN to associate the user equipment with its WLAN identifier. In doing so, the method provides that the WLAN can obtain information relating to the device from a 3GPP RAN using an identifier used by the WLAN to uniquely identify a device, thereby effectively accelerating any processes that rely on this information. For the purposes of this description the WLAN identifier will be identified as the MAC address of the device.

A method according to the invention involves the entity of the 3GPP RAN obtaining the MAC address of a device by requesting the device to provide its MAC address. A MAC address is a unique identifier used by WLANs to identify a device. Often the MAC address is assigned to a network interface card of a device and stored in the card's read-only memory. The device, upon receiving the request will query the network interface card of the device in order to obtain the MAC address associated with the device.

The device transmits a response message to the entity, the response message including the MAC address of the device.

The 3GPP network entity can then store the MAC address in a memory. The MAC address for the device may, for example, be stored in association with an identifier of the device, e.g. the IMSI associated with the device. Storing the MAC address of the device in such a way enables the 3GPP network entity to be able to respond to a request for load and/or performance information from a WLAN entity where the request only includes the MAC address of the device.

Figure 1:
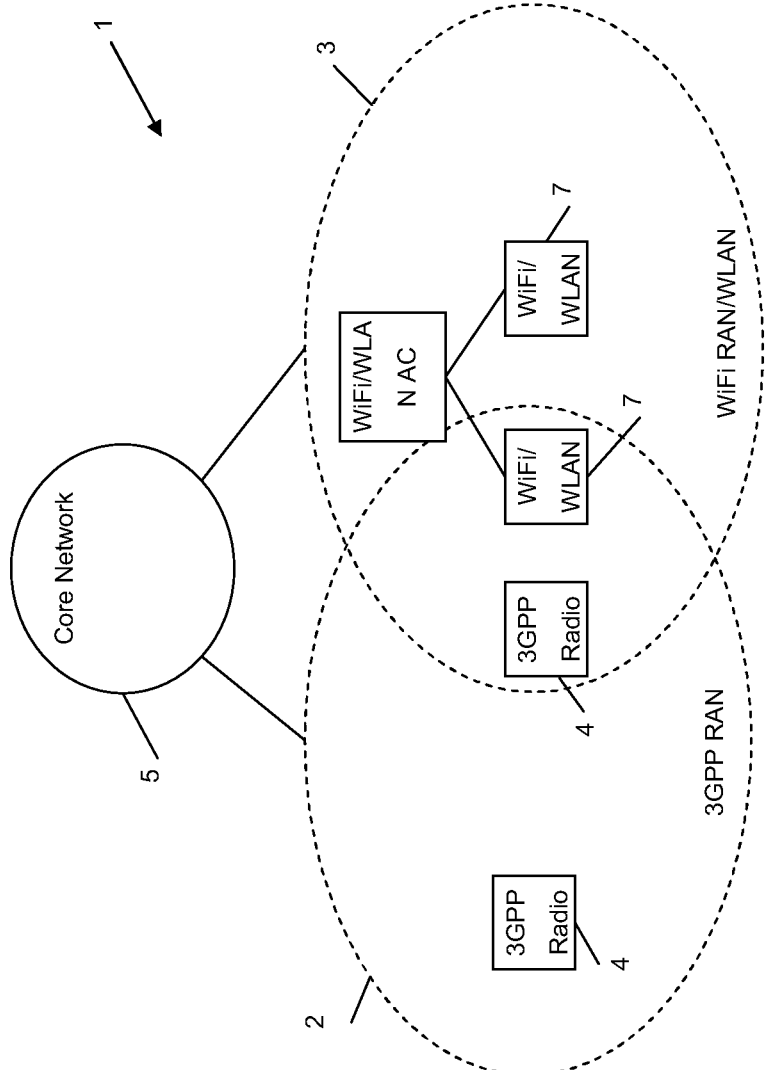
FIG. 1 illustrates schematically an example of a heterogeneous access network.
Figure 2:
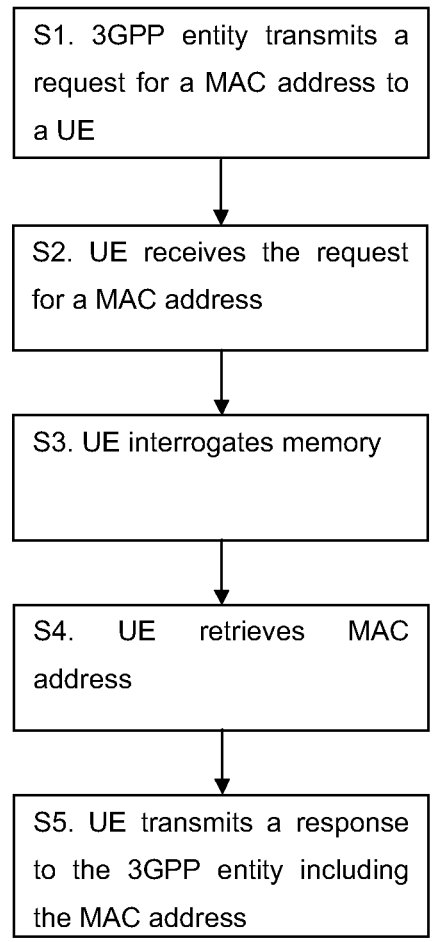
FIG. 2 is a flow diagram illustrating an example of the procedure of obtaining a MAC address in accordance with the methods described herein.

FIG. 2 is a flow diagram illustrating an example of the procedure implemented by an entity of a 3GPP RAN. The steps performed are as follows:

S1. The 3GPP entity transmits a request for the device's MAC address.
S2. The device receives the request for the MAC address.
S3. The device interrogates its read-only memory to determine its MAC address.
S4. The device transmits its MAC address to the 3GPP entity
S5. The 3GPP entity causes the MAC address of the device to be stored in association with the device's 3GPP identity.

Figure 3:
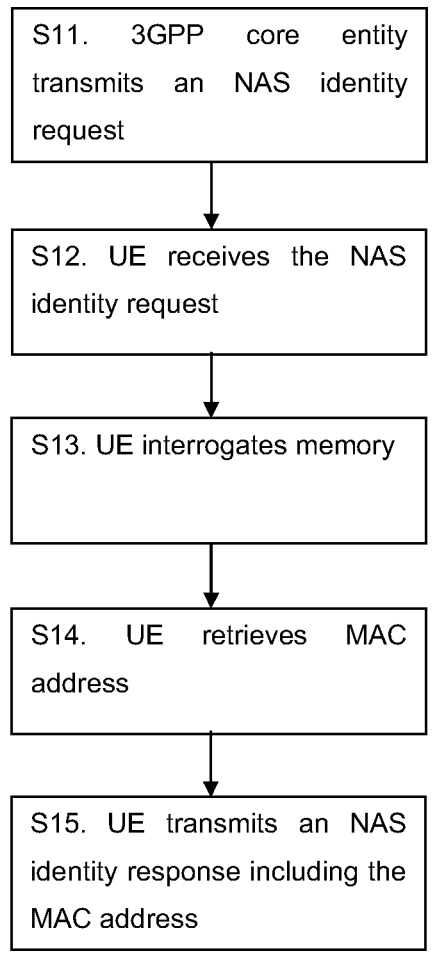
FIG. 3 is a flow diagram illustrating an example of the procedure implemented by an entity in the core network of a 3GPP network in accordance with the methods described herein.

FIG. 3 is a flow diagram illustrating an example of the procedure implemented by an entity of a core part of the 3GPP network using Non-Access Stratum (NAS) signalling. The steps are performed as follows:

S11. The 3GPP core entity transmits an NAS "Identity Request", the NAS "Identity Request" including a request for the MAC address of the device in addition to the IMSI of the device.
S12. The device receives the NAS "Identity Request" message.
S13. The device interrogates its read-only memory to determine its MAC address and its SIM card for its IMSI.
S14 The device populates an NAS "Identity Response" message, including its MAC address in the NAS "Identity Response" message.
S14. The device transmits NAS "Identity Response" message to the 3GPP entity.
S15. The 3GPP entity causes the MAC address of the device to be stored in association with the device's IMSI.

Although the above embodiment of the invention has been described with reference to an NAS Identity Request and NAS Identity Response message it will be clear to the skilled person that any suitable NAS message, whether available currently or in the future, may be used to request and transmit the WLAN identifier of the device. Additionally the request and response messages may not only be sent using the NAS protocol but may be transmitted using any suitable protocol. For example a node in the radio network such as eNodeB may transmit the request and receive the response using RRC protocol messages. In this way the WLAN identity of the device may be stored in the radio network in addition to or instead of the core network of the 3GPP network.

Figure 4:
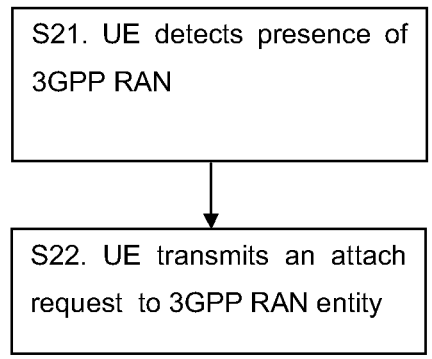
FIG. 4 is a flow diagram illustrating an alternative embodiment of the procedure implemented by a device in accordance with the methods described herein.

FIG. 4 is a flow diagram illustrating an example of the procedure implemented by a device according to an alternative embodiment of the present invention. The steps are performed as follows:

S21. The device detects a 3GPP RAN.
S22. The device transmits an attach request message including the MAC address and IMSI associated with the device.

Figure 5:
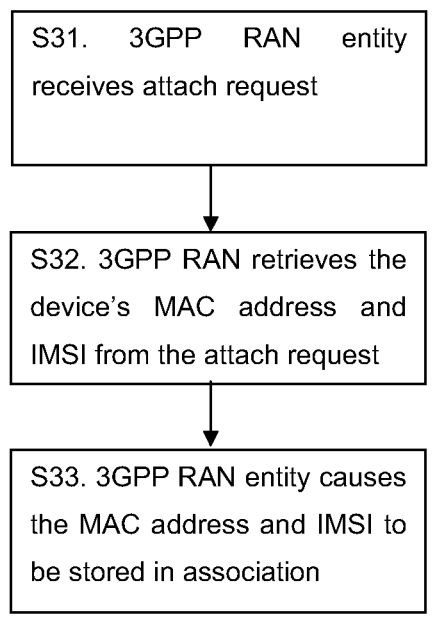
FIG. 5 is a flow diagram illustrating the alternative embodiment of the procedure implemented by an entity in the 3GPP network in accordance with the methods described herein.

FIG. 5 is a flow diagram illustrating an example of the procedure implemented by an entity of the 3GPP network according to the alternative embodiment of the present invention described with reference to FIG. 4. The steps are performed as follows:

S31. An entity in the 3GPP network receives an attach request message from the device. The attach request includes the device's MAC address and IMSI.
S32. The entity retrives the device's MAC address and IMSI from the attach request message.
S33. The entity causes the device's MAC address and IMSI to be stored in association with one another.

As will be understood by the skilled man the MAC address associated with the device may not be transmitted in an attach request message but may be included within any suitable message when the device is associating with a 3GPP network. For example, the message may be a PDP context activation message.

Figure 6:
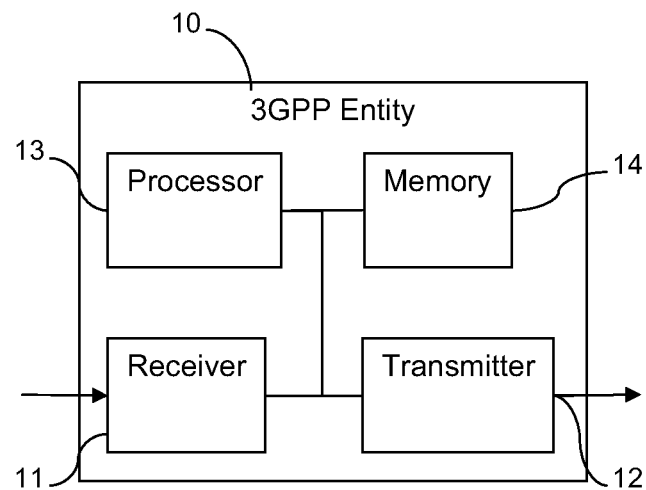
FIG. 6 illustrates schematically an embodiment of a 3GPP entity configured to implement the methods described herein.

FIG. 6 illustrates schematically an embodiment of a 3GPP entity 10 configured to implement the methods described above. The 3GPP entity 10 can be implemented as a combination of computer hardware and software and comprises a receiver 11, transmitter 12, a processor 13, and a memory 14. The memory 14 stores the various programs/executable files that are implemented by the processor 13, and also provides a storage unit for any required data. For example, the memory 14 can store any previously obtained IMSIs and the associated MAC addresses (if these are stored at the 3GPP entity). The programs/executable files stored in the memory 14, and implemented by the processor, include but are not limited to a MAC address retrieval unit, an IMSI retrieval unit, a device entity storage unit to store IMSI & MAC addresses, and a 3GPP information retrieval unit configured to implement the methods described above.

Figure 7:
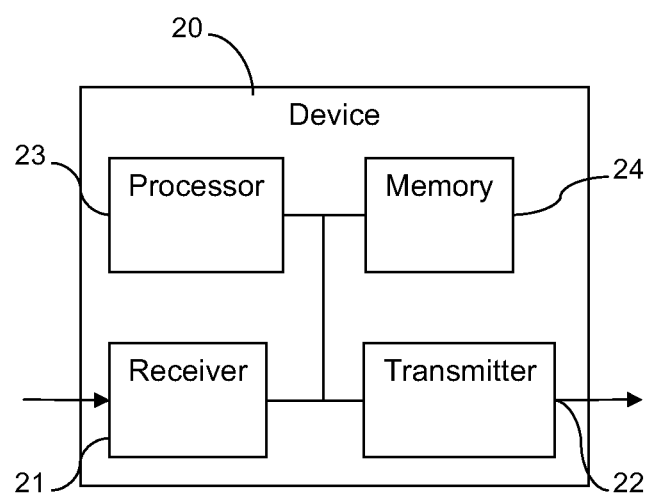
FIG. 7 illustrates schematically an embodiment of a device configured to implement the methods described herein.

FIG. 7 illustrates schematically an embodiment of a device 20 configured to implement the methods described above. The device 20 can be implemented as a combination of computer hardware and software and comprises a receiver 21, transmitter 22, a processor 23, and a memory 24. The memory 24 stores the various programs/executable files that are implemented by the processor 23, and also provides a storage unit for any required data. For example, the memory 24 can store the MAC address of the device. The programs/executable files stored in the memory 24, and implemented by the processor, include but are not limited to a MAC address retrieval unit configured to implement the methods described above.

It will be understood by the skilled person that the WLAN identifier for the device may be any suitable identifier for the device for use by the WLAN RAN and not only a MAC address. Additionally the 3GPP identifier for the device may be any identifier used in a 3GPP network to identify the device and not only an IMSI. For example, the WLAN identifier may be the IMSI number associated with the device if EAP-SIM or EAP-AKA used for authentication. The 3GPP identifier may be the Temporary Mobile Subscriber Identity (TMSI) or an S1 Application Protocol identifier as used in a Long Term Evolution (LTE) network. Additionally, the International Mobile Equipment Identity may be used as either the WLAN identifier, the 3GPP identifier or to associate the WLAN identifier and the 3GPP identifier.

By way of example, the 3GPP entity could be any of a 3GPP core node, a 3GPP radio node controller, RNC or and E-UTRAN Node B.

The 3GPP entity can be configured to store a 3GPP identity and an associated WLAN identity of a device locally, such that the step of causing storage of the obtained WLAN identity in association with the 3GPP identity involves storing the obtained WLAN identity in the 3GPP entity. Alternatively, the 3GPP entity can be configured to cause a further entity of a 3GPP network including the 3GPP RAN to store a WLAN identity in association with the 3GPP identity. To do so, the entity could send a storage request to the further entity, the storage request including an obtained WLAN identity in association with the 3GPP identity. The further entity may be, for example, the management system of the 3GPP network.

By 3GPP RAN or network what is meant is any RAN or network which is governed by 3GPP Standards. For example, a 3GPP network may be a a UTRAN, an eUTRAN or a Long Term Evolution (LTE) network. WLAN may refer to any wireless local area network including, but not limited to a WiFi RAN.

Although the WLAN and 3GPP identifiers have been described as being for the device all that is required for the invention to work is for the WLAN and 3GPP identifiers to be associated with the device. For example they may be stored on the device's hardware and therefore be for the device. Alternatively, either or both of the WLAN and 3GPP identifiers may be stored on a removable medium. For example, the 3GPP identifier may be an IMSI stored on a SIM card.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. In addition, whilst the above described embodiments specifically relate to heterogeneous networks comprised of at least a 3GPP RAN and a WLAN, the principles of the methods described herein are equally applicable to heterogeneous networks that comprise other radio access technologies; such as Global System for Mobile Communications (GSM), cdmaOne and CDMA2000.

We claim:

1. A method of operating an entity of a 3rd Generation Partnership Project, 3GPP, network including a 3GPP Radio Access Network, RAN, the method comprising:
   receiving, at the entity, a WLAN identifier associated with a device in communication with the 3GPP network and a 3GPP identifier associated with the device;
   associating the WLAN identifier with the 3GPP identifier;
   causing storage, within the 3GPP network, of the WLAN identifier in association with the 3GPP identifier; and
   determining performance of the device in the 3GPP or a WLAN network based on the association between the WLAN identifier and the 3GPP identifier.

2. The method as claimed in claim 1, further comprising transmitting a request to the device, the request including a request for the WLAN identifier associated with the device.

3. The method as claimed in claim 2, wherein the request is transmitted using a Non-Access Stratum, NAS, protocol or using a Radio Resource Control, RRC, protocol.

4. The method as claimed in claim 1, wherein the step of causing storage within the 3GPP network of the obtained WLAN identifier in association with the 3GPP identifier comprises:
   storing the WLAN identifier in a memory of the 3GPP entity.

5. The method as claimed in claim 1, wherein the step of causing storage within the 3GPP network of the obtained WLAN identifier in association with the 3GPP identifier comprises:
   sending a storage request to a further entity of the 3GPP network, the storage request including the obtained WLAN identifier and the 3GPP identifier.

6. The method as claimed in claim 5, wherein the 3GPP entity or the further 3GPP entity comprises a core network node or a radio network node.

7. The method as claimed in claim 1, wherein the WLAN identifier is a MAC address.

8. An entity of a 3rd Generation Partnership Project, 3GPP, network comprising a 3GPP Radio Access Network, RAN, the entity comprising:
   a receiver operable to receive a WLAN identifier associated with a device in communication with the 3GPP network and a 3GPP identifier associated with the device; and
   a processor operable to associate the WLAN identifier with the 3GPP identifier and cause storage of the WLAN identifier in association with the 3GPP identifier in the 3GPP network, the processor further operable to determine performance of the device in the 3GPP or a WLAN network based on the association between the WLAN identifier and the 3GPP identifier.

9. The entity as claimed in claim 8, further comprising a transmitter operable to transmit a request to the device in communication with the 3GPP RAN, the request including a request for the WLAN identifier associated with the device.

10. The entity as claimed in claim 9, wherein the request is transmitted using a Non-Access Stratum, NAS, protocol or a Radio Resource Control, RRC, protocol.

11. The entity as claimed in claim 8, wherein the processor is operable to cause storage of the WLAN identifier in a memory of the 3GPP entity.

12. The entity as claimed in claim 8, wherein the processor is operable to cause storage within the 3GPP network of the obtained WLAN identifier in association with the 3GPP identifier by causing the entity to transmit a storage request to a further entity of the 3GPP network, the storage request including the obtained WLAN identifier and the 3GPP identifier.

13. The entity as claimed in claim 12, wherein the 3GPP entity or the further 3GPP entity comprises a core network node or a radio network controller.

14. The entity as claimed in claim 8, wherein the WLAN identifier is a MAC address.

15. A method of operating a device in communication with a 3rd Generation Partnership Project, 3GPP, network, the method comprising:
   retrieving a WLAN identifier associated with the device; and
   transmitting the retrieved WLAN identifier to the 3GPP network for associating the WLAN identifier with a 3GPP identifier and determining performance of the device in the 3GPP or a WLAN network based on the association between the WLAN identifier and the 3GPP identifier.

16. The method as claimed in claim 15, further comprising receiving a request from an entity of the 3GPP network at the device, the request including a request for the WLAN identifier associated with the device, wherein retrieving the WLAN identifier and transmitting the retrieved WLAN identifier is performed in response to the request.

17. The method as claimed in claim 15, wherein retrieving the WLAN identifier and transmitting the WLAN identifier is performed upon the device associating with the 3GPP network.

18. The method as claimed in claim 15, wherein the retrieved WLAN identifier is transmitted using a Non-Access Stratum, NAS, protocol or a Radio Resource Control, RRC, protocol.

19. A device in communication with a 3rd Generation Partnership Project, 3GPP, network including a 3GPP Radio Access Network, RAN, the device comprising:
   a processor operable to retrieve a WLAN identifier associated with the device; and
   a transmitter operable to transmit the retrieved WLAN identifier to the 3GPP network for associating the WLAN identifier with a 3GPP identifier and determining performance of the device in the 3GPP or a WLAN network based on the association between the WLAN identifier and the 3GPP identifier.

20. The device as claimed in claim 19, further comprising a receiver operable to receive a request from an entity of the 3GPP network at the device, the request including a request for the WLAN identifier associated with the device; wherein the processor retrieves the WLAN identifier in response to the request.

21. The device as claimed in claim 19, wherein the processor is operable to retrieve the WLAN identifier during association with the 3GPP network.

22. The device as claimed in claim 19, wherein the retrieved WLAN identifier is transmitted using a Non-Access Stratum, NAS, protocol or a Radio Resource Control, RRC, protocol.

\* \* \* \* \*